(12) United States Patent
Perrotta et al.

(10) Patent No.: US 12,738,853 B2
(45) Date of Patent: Sep. 15, 2026

(54) DC-DC CONVERTER WITH GALVANIC ISOLATION AND CORRESPONDING METHOD OF CONTROL OF A DC-DC CONVERTER

(71) Applicant: STMICROELECTRONICS S.r.l., Agrate Brianza (IT)

(72) Inventors: Stefano Perrotta, Catania (IT); Salvatore Giuseppe Privitera, Paterno' (IT); Francesco Pulvirenti, Acireale (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 273 days.

(21) Appl. No.: 18/437,919

(22) Filed: Feb. 9, 2024

(65) Prior Publication Data

US 2024/0291387 A1 Aug. 29, 2024

(30) Foreign Application Priority Data

Feb. 27, 2023 (IT) ........................ 102023000003468

(51) Int. Cl.
*H02M 3/335* (2006.01)
*H02M 1/00* (2006.01)
*H02M 3/00* (2006.01)

(52) U.S. Cl.
CPC ..... *H02M 3/33523* (2013.01); *H02M 1/0054* (2021.05); *H02M 3/01* (2021.05); *H02M 3/33592* (2013.01)

(58) Field of Classification Search
CPC .. H02M 3/33523; H02M 1/0054; H02M 3/01; H02M 3/33592
See application file for complete search history.

(56) References Cited

U.S. PATENT DOCUMENTS 6,987,425 B1 1/2006 Sutardja
7,915,968 B2 * 3/2011 Kim .................... H03B 5/1271 331/36 L (Continued)

OTHER PUBLICATIONS

Chen, "Fully Integrated Isolated DC-DC Converter Using Micro-Transformers," 2008 Twenty-Third Annual IEEE Applied Power Electronics Conference and Exposition, Austin, TX, USA, 2008, pp. 335-338.

(Continued)

*Primary Examiner* — Lakaisha Jackson
(74) *Attorney, Agent, or Firm* — Seed Intellectual Property Law Group LLP

(57) ABSTRACT

Provided is a DC-DC converter with galvanic isolation comprising a resonant oscillator coupled to a primary winding of a galvanic isolation transformer. A rectifier is coupled to a secondary winding of the transformer to provide an output voltage. The DC-DC converter comprises a regulation loop configured to regulate an output voltage with respect to a reference voltage by controlling a current flowing in the resonant oscillator as a function of a result of a signal indicative of the comparison between the output voltage and the reference voltage. The resonant oscillator is configured to operate at a frequency, in particular tuned at sub-resonant point, in particular sub-harmonic frequency, below a resonance frequency of the resonant oscillator which maximizes a quality factor of the resonant oscillator, in particular below a resonance frequency of a LC tank circuit comprised in the resonant oscillator which maximizes a quality factor of the LC tank circuit.

20 Claims, 6 Drawing Sheets

(56) References Cited

U.S. PATENT DOCUMENTS

| | | | | |
|---|---|---|---|---|
| 2003/0025566 | A1* | 2/2003 | Rogers | H03B 5/1262<br>331/109 |
| 2005/0099827 | A1* | 5/2005 | Sase | H02M 3/33571<br>363/16 |
| 2017/0353125 | A1* | 12/2017 | Chen | H02M 7/217 |
| 2019/0222126 | A1* | 7/2019 | Parisi | H02M 3/33523 |
| 2022/0140786 | A1 | 5/2022 | Lazaro | |
| 2022/0407425 | A1* | 12/2022 | Calabrese | H02M 1/123 |
| 2023/0396174 | A1* | 12/2023 | Bernardon | H02M 3/33569 |

OTHER PUBLICATIONS

Zhou et al., "Impact on Efficiency of Inductive Battery Charging System by Sub-Resonant Frequency Control during Large Variations in Coupling Conditions," 2020 IEEE 21st Workshop on Control and Modeling for Power Electronics (COMPEL), Aalborg, Denmark, Nov. 9, 2020, pp. 1-8.

* cited by examiner

DC-DC CONVERTER WITH GALVANIC ISOLATION AND CORRESPONDING METHOD OF CONTROL OF A DC-DC CONVERTER

BACKGROUND

Technical Field

The description relates to techniques for DC-DC conversion with galvanic isolation, where the converter comprises a resonant oscillator coupled to a primary winding of a galvanic isolation transformer, a rectifier being coupled to a secondary winding of said galvanic isolation transformer to provide an output voltage, said DC-DC converter comprising a regulation loop configured to regulate said output voltage by controlling a current flowing in said resonant oscillator.

The description relates in particular to DC DC converter architectures for power transfer through a galvanic isolation barrier which are obtained in BCD (Bipolar CMOS DMOS) technology.

Description of the Related Art

Energy transfer is a very important aspect in electronics in many sectors especially consumer, IoT (Internet of Things) and industrial.

Also important is the galvanic isolation which is often required in many applications for safety reasons. In this direction the market requires the design of fully integrated DC-DC converters with galvanic isolation. The main challenge of these architectures is to improve efficiency and control of the power stage; the isolation element is an integrated coreless transformer.

More specifically, in recent years, the market pushes towards integrated solution for many applications. Isolated DC-DC converters (for power ranges <1 W) aim to reduce size, cost and improve efficiency.

Galvanic isolation is intended to guarantee safety and the research in this field for power transfer is mainly focused on inductive isolation.

Currently, the converters need some external components, one of them being the transformer, which is among the components requiring the most area.

Technology is thus currently pushing for integration of the transformer, justified by the reliability of having integrated components, by the reduction of the size and of the application costs.

The research is oriented towards the realization of integrated coreless transformer to be integrated in a System in Package (SiP).

The use of the transformer ensures a Breakdown Voltage greater than 10 Kv. For this reason, the size may be limited and consequently the transformer should be designed to operate at higher frequencies with respect to discrete transformers, e.g., in the order of tens or hundreds of MHz. The system, e.g., the DC-DC converter, is designed in order to maximize the efficiency starting from the Quality Factor of the transformer; but at the frequencies indicated above are also very important the switching losses of the analog circuit. A choice of the operating point of the converter may determine the efficiency of the system.

In FIG. 1 it shown schematically by way of example a DC-DC converter with galvanic isolation, indicated as a whole with the numerical reference 10, which includes a DC/AC inverter 11, inputted by a DC input voltage VIN.

The DC/AC Inverter 11 is coupled by a transformer 12 to an AC/DC rectifier 13 which outputs a DC output voltage VOUT.

Typical power losses include leakage at the primary side of the transformer, comparable leakage at the secondary side, and a remarkably greater power losses in the coreless transformer.

The way the power stage is driven, the regulation and switch mode represent important parts with high impact in terms of safety.

The choice of how to regulate impacts on efficiency and also on the voltage dynamic, i.e., variation of voltage with time, Dv/dt, that develop during switching operation.

Peaks in the voltage on the transformer coil and inside the analog circuit, can be dangerous and they are present on startup, i.e., at power on, where the input voltage VIN may be represented by a voltage step from zero volt to the on voltage value, and during regulation, where a feedback signal determines the control of energy transfer properly turning Off and On the primary side. The voltage dynamic, Dv/dt, at the output depends on the LC circuit formed at transformer 12 and power stage inside 11 and 13 of the converter 10 and also on the energy of the power stages.

Currently, typical architectures of fully integrated DC-DC converters, such as the exemplary architecture 20 described schematically with reference to FIG. 2, may comprise an oscillator 21 that drives a coreless transformer 22. This implements a DC/AC conversion where the transformer 22 is the galvanic isolation element. The oscillator 21 can be obtained according to different architectures, the most popular being the self-resonant (cross-coupled pair of transistors) and clock driving architectures. On the secondary side it is needed to convert the AC wave in DC; typically, this is obtained with a simple diode rectifier 23. Every part of the converter system 20 plays a role in the calculation of the efficiency.

This type of DC-DC converter can be used in many applications where strong isolation and isolated power supply are required. In fact it allows to eliminate an isolated power supply which is very important especially in applications with space constraints.

Typical applications are:

Isolated Gate Driver;

PLC analog input and output modules

Isolated Interface and sensors

Standalone isolated DC DC Converter;

Motor control;

Industrial automation;

Isolated voltage and current sensing;

RS-485/RS-422/CAN transceiver;

Medical equipment.

FIG. 3 shows an architecture 30, which on the primary side of a power transformer 32 comprises an N-MOS cross coupled auto-resonant oscillator 31.

The oscillation is possible because of the LC-tank between a Tank-Capacitor CT and Coil Inductance, the inductance of the transformer 32. In other word the LC-tank corresponds to the parallel of the capacitor CT and of the inductance seen from the input terminals of the transformer 32. In the example the oscillation frequency set by the LC-tank is 180 MHz.

The power transformer 32 has central tap Tc on primary side where is connected the Input Power Supply, i.e., DC power input VIN, e.g., 5V.

On the other side (secondary side), the final conversion is realized by a rectifier 33 comprising Schottky Diodes, which are chosen for the best features over traditional diodes such as low voltage threshold and ability to operate at high frequency.

Furthermore, in this architecture there is the regulation of the output voltage VOUT through a loop 34 with PWM control. The output voltage VOUT is in the example shown brought through a voltage divider 345 to an input of an error amplifier 343, which receives at the inverting input a reference voltage REF, thus producing at output an error signal, in this case logic high or low according to the result of the comparison, although in variants the error may be proportional to the difference of the output voltage VOUT and reference voltage REF. A comparator receiving a sawtooth signal on the non-inverting input, receives such error and transforms it in a PWM feedback signal PFB, which is brought back, through a further isolation galvanic transformer 341 to the block 342, i.e., a MOSFET coupled between the coupled sources of the NMOS of the oscillator 31 which gate is driven by a driver on the secondary of the further isolation galvanic transformer 341, which controls the current from the source of the NMOS of the oscillator 31, here embodied by a NMOS transistor which gate is driven by the feedback signal PFB brought through the further transformer 341.

The main drawbacks of this solution is the operating frequency (about 180 MHz), the high frequency worsening the switching losses. A full bridge Schottky rectifier here is better than simple diodes but there are also important losses for global efficiency.

BRIEF SUMMARY

Provided is a converter system with improved efficiency.

Provided is a DC-DC converter.

One or more embodiments may relate to a corresponding method of driving such DC-DC converter As mentioned, the present disclosure describes solutions regarding a DC-DC converter with galvanic isolation comprising a resonant oscillator coupled to a primary winding of a galvanic isolation transformer, a rectifier being coupled to a secondary winding of said galvanic isolation transformer to provide an output voltage, said DC-DC converter comprising a regulation loop configured to regulate said output voltage with respect to a reference voltage by controlling a current flowing in said resonant oscillator as a function of the result of a signal indicative of the comparison between said output voltage and said reference voltage, wherein said resonant oscillator is configured to operate at a frequency, below the resonance frequency of the resonant oscillator which maximizes the quality factor of the oscillator, in particular below the resonance frequency of a LC tank comprised in said resonant oscillator which maximizes the quality factor of said LC tank.

In variant embodiments said operating frequency is a sub-harmonic of the resonance frequency.

In variant embodiments, said galvanic isolation transformer comprises a central tap on the primary winding to which the output of the resonant oscillator is coupled and a central tap on the secondary winding to which the input of the rectifier is coupled, and the rectifier is a synchronized rectifier.

In variant embodiments, said regulation loop comprises a current generator module which determines the current flowing in said resonant oscillator current sink, which comprises a plurality of current generators in parallel setting a respective current path (from the resonant oscillator when activated.

In variant embodiments, said regulation loop comprises a logic module receiving as input said signal indicative of the comparison between said output voltage and said reference voltage and configured to select for activation a corresponding set of current generators in said plurality of current generators.

In variant embodiments, said logic module is configured to switch off the plurality of current generators in sequence, in particular from the current generator drawing the greater current to the smaller, when the output voltage is greater than the reference voltage, and to switch on the plurality of current generators in sequence, in particular from the current generator drawing the smaller current to the greater, when the output voltage is smaller than the reference voltage.

In variant embodiments, said logic module is configured to switch on the plurality of current generators in sequence, in particular from the current generator drawing the smaller current to the greater, during a power on interval indicated by a respective power on signal.

In variant embodiments, said transformer is an integrated coreless transformer, in particular to be integrated in a System in Package (SiP).

In variant embodiments, said converter operates at a frequency in a range between tens and hundreds of MHz, in particular between 10 and 200 MHz.

The present disclosure also regards a method of controlling a DC-DC converter according to any of the embodiments, wherein said method comprises switching off the plurality of current generators in sequence, in particular from the current generator drawing the greater current to the smaller, when the output voltage is greater than the reference voltage, and to switch on the plurality of current generators in sequence, in particular from the current generator drawing the smaller current to the greater, when the output voltage is smaller than the reference voltage.

In variant embodiments, said method comprises switching on the plurality of current generators in sequence, in particular from the current generator drawing the smaller current to the greater, during a power on interval indicated by a respective power on signal.

BRIEF DESCRIPTION OF THE SEVERAL VIEWS OF THE DRAWINGS

One or more embodiments will now be described, by way of example only, with reference to the annexed figures wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 4:
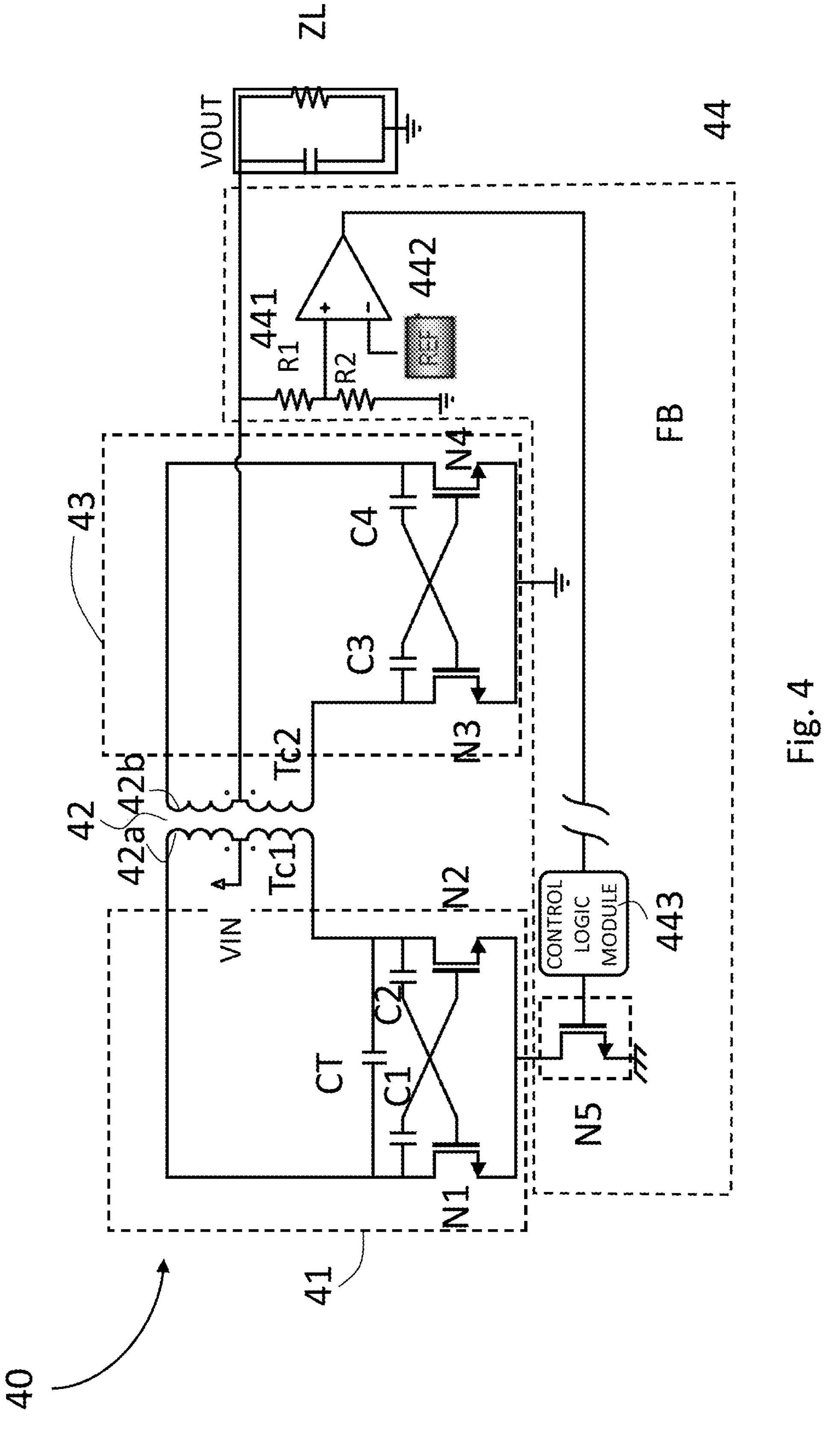
FIG. 4 is a circuit schematics of a converter according to embodiments, FIG. 5 details an embodiment of a logic module of the converter here described.

With reference to FIG. 4, it shown schematically an architecture 40 of fully integrated DC-DC converter with galvanic isolation according to the solution here described.

The architecture 40 comprises a circuit block 41 which includes a pair of cross coupled NMOS transistors N1 and N2 with respective capacitors C1, C2 arranged in series on the coupling between the gate of one of the NMOS N1, N2 and the drain of the other. The drains of the NMOS transistors N1, N2 are coupled one to the other by means of a tank capacitor CT and are respectively coupled to the two terminals of a primary winding 42*a* of a power transformer 42, which is in particular an integrated coreless power transformer, ensuring the galvanic isolation. The circuit block 41 with the primary winding 42*a* forms a self-resonant NMOS oscillator.

The power transformer 42 comprises also a central tap Tc1, which is coupled to the DC input voltage VIN. A synchronous rectifier 43 is provided on the secondary side, which includes a pair of cross coupled NMOS transistors N3, N4 with respective capacitors C3, C4 on the coupling between the gate of one of the NMOS transistors N3, N4 and the drain of the other. The drains of the NMOS transistors N3, N4 are respectively coupled to the two terminals of a secondary winding 42*b* of the power transformer 42. An output node of the DC-DC converter 40 is taken on a central tap Tc2 on the secondary winding 42*b*, on which is taken the output voltage VOUT, to which a load ZL is shown coupled, and to which is coupled also control loop 44.

The synchronous rectifier 43 is coupled to the terminals of the secondary winding of the power transformer 42. Circuit 43 operates as self-driven synchronous rectifier, i.e., the gate source voltages of the NMOS transistors N3, N4 vary in a complementary manner with period or duty cycle depending on the period or duty cycle of the voltage at the input of the transformer 42, determined by the oscillator 41. Therefore, the resulting waveform on the load ZL combining such two complementary waveforms is rectified. In the synchronous rectifier 43, capacitor C3 and C4 are used as voltage divider with the equivalent capacitance on the gates of the NMOS gates to guarantee the correct and safe gate source voltage.

The control loop 44 comprises a voltage divider 441, i.e., a resistor R1 coupled to the output node VOUT in series with a resistor R2 coupled to ground, providing at its output node, i.e., the node common between resistors R1 and R2, a voltage proportional to the output voltage VOUT to an differential amplifier 442, in particular implemented by an operational amplifier, which at its inverting input receives a reference voltage REF. The differential amplifier 442 operates substantially as a comparator issuing a feedback signal FB which is for instance logic high if the voltage VOUT is over the reference voltage VREF inputted to a control logic module 443, which, on the basis of the value of the feedback signal FB, drives the gate of a NMOS generator module, N5, coupled to the sources of NMOS transistors N1 and N2 and its source to ground, controlling the current flowing in the self-resonant NMOS oscillator 41 and 42*a*. The NMOS generator module N5 is shown as a NMOS transistor with drain coupled to the sources of NMOS N1, N2 and source to ground, nevertheless, as shown in the following, included a plurality of generators in parallel.

Thus, the converter 40 comprises at the primary side a typical self-resonant NMOS structure, i.e., oscillator 41 and transformer 42, with central tap and a control logic module 443 for performing a feedback control loop of the output voltage VOUT. On the secondary side there is a synchronous rectifier 43 with the central tap of transformer 42 and the control circuitry, i.e., voltage divider 441 and differential amplifier 442, that generates the feedback signal FB. As shown, with respect to FIG. 3 in this case the feedback signal FB correspond substantially to the error between the regulated quantity, the voltage output VOUT, and the reference quantity, reference voltage, without any PWM generation, while block 443 represents substantially the controller of the loop. It is noted that for feedback signal FB is intended here (and in FIG. 3) the signal fed back to the primary side, although from a control point view represents the error between the regulated quantity and the set point or reference, while the regulated quantity, the output voltage VOUT is fed back through the divider 441, which represent the measurement system according to one of the most diffused schematization of control loops.

The cross coupled NMOS oscillator 41 and 42*a* is configured to operate at sub-resonant frequency (in the example at 60 MHz), by tuning the LC-tank, i.e., tank capacitor CT. Typical value of capacitance of the tank capacitor CT are in the order of tens pF while inductance is in the order of tens nH.

BCD (Bipolar CMOS DMOS) Technology used for the exemplary embodiment shows losses at high frequency >100 MHz. This is a trade-off for overall system efficiency.

Then, choosing the central tap on both sides of transformer 42, the magnetic flux during the switching phases is optimized. The central tap solution in the secondary side reduces the resistive loss during rectification (compared to a full bridge diode) halving the transformer resistive path.

Figures 1, 2:
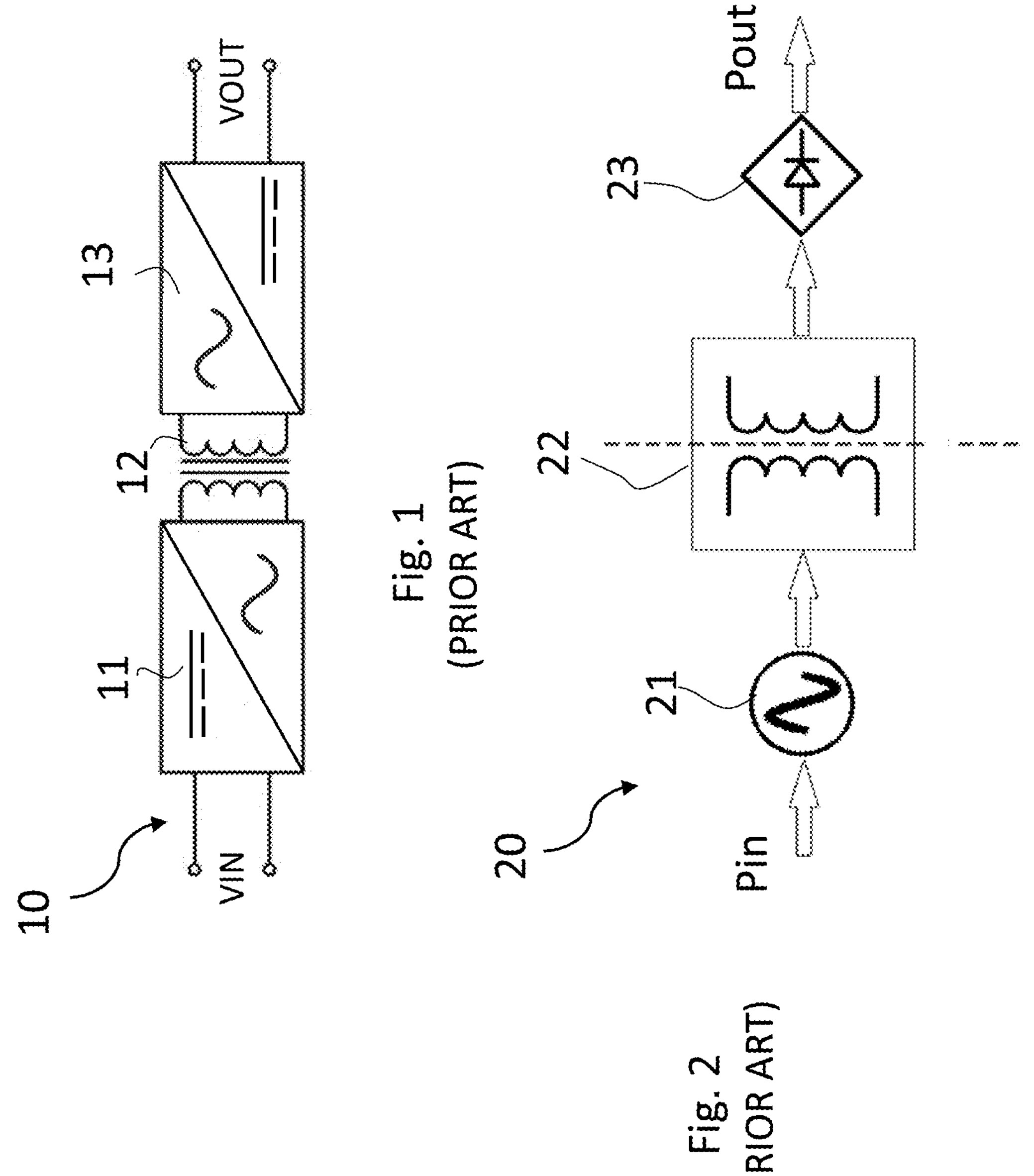
FIG. 1 shows a DC-DC converter with galvanic isolation.
FIG. 2 shows a DC-DC converter including an oscillator that drives a coreless transformer.
Figure 3:
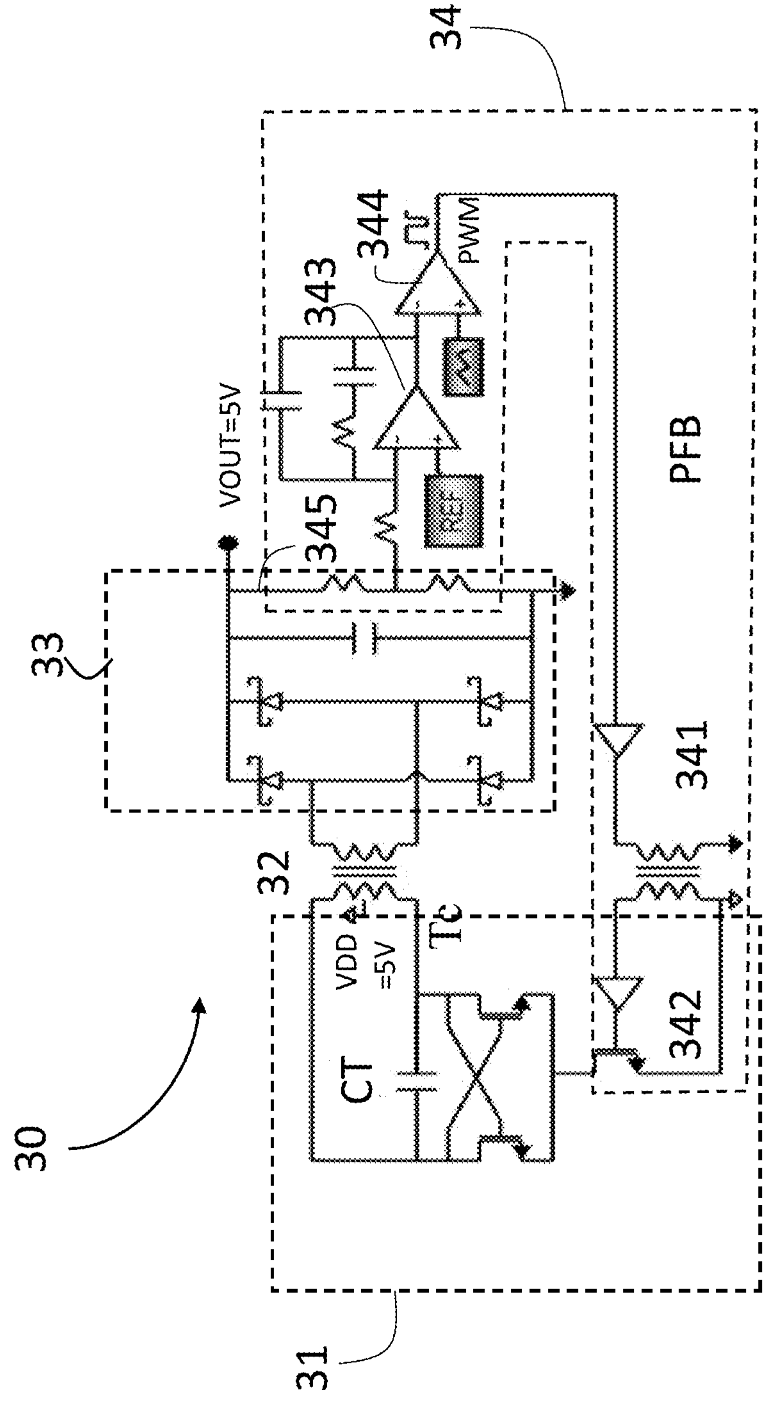
FIG. 3 shows an architecture having, on a primary side of a power transformer, an N-MOS cross coupled auto-resonant oscillator.

With respect to the solution with a passive bridge rectifier with Schottky diode such as in block 33 in FIG. 3, here a synchronous rectifier 33 is implemented. Such type of rectifier, to the difference of Schottky diodes, can be implemented in BCD technology. Such type of rectifier guarantees a low on drain to source voltage drop, even lower than the voltage drop of the Schottky diodes, which results in less power losses in favor of the efficiency of the system.

The control logic module 443 is designed to avoid dangerous voltage spikes. The design is oriented to better control the system and energy management.

Figure 5:
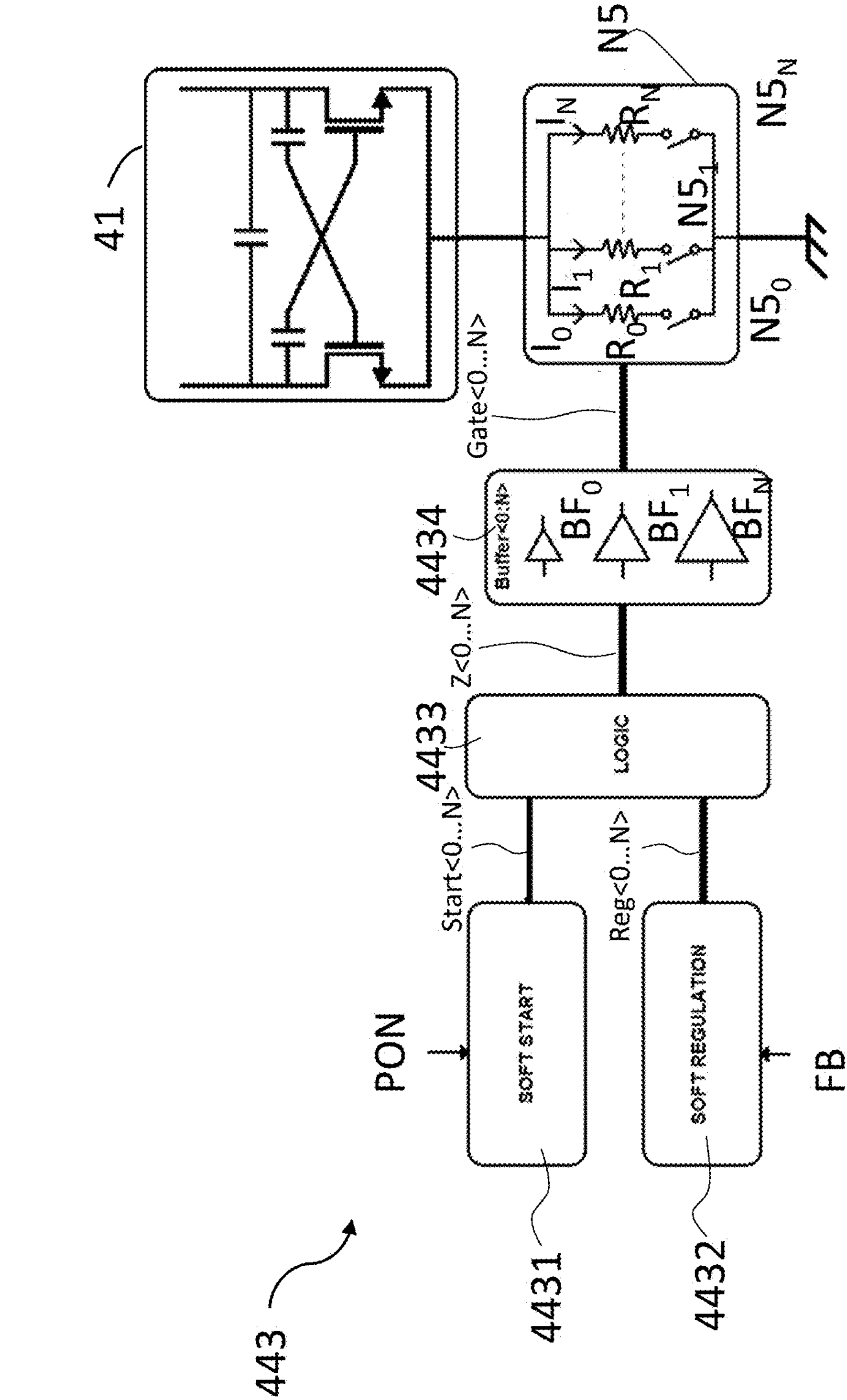

As shown in FIG. 5, the control logic module 443 implements a soft start logic module 4431 and soft regulation logic module 4432, both logic modules which may be for instance implemented as software modules in a processing device, such as a microprocessor or a DSP, that guarantee safety against voltage peaks due the LC tank CT and prevents from using other protections that are often expensive in terms of area and efficiency.

The soft start logic module 4431 is driven by a PowerON signal PON while the regulation logic module 4432 by the feedback signal FB. The PowerON signal may be provided by an external logic module, e.g., the processor controlling the converter 40. A further generator switch on/off logic 4433 issues a value Z, integer between 0 and N to a set of N+1, 0 to N, buffers 4434 in parallel driving the gate of a respective NMOS generator module N5. Each buffer in the set of buffers 0 to N is greater, i.e., drives a greater current at its output than the other, increasing from 0 to N. The NMOS generator module, N5 corresponds in fact to N+1 NMOS $N5_0$ . . . . $N5_N$ in parallel with their drain coupled to the sources of the NMOS N1 and N2, in particular through respective resistors $R5_0$ . . . . $R5_N$ which may represent the on drain source resistance $RDS_{ON}$ of their relative NMOS switch $N5_0$ . . . . $N5_N$, and the source coupled to ground, while each gate of the NMOS $N5_0$ . . . . $N5_N$ is driven by a respective buffer 4434, $BF_0$ . . . . $BF_N$ in the set of N+1 buffers. Thus, N5 represents a quantized current generator to quantize the Source current of primary side through N+1 current path $I_0$ . . . . $I_N$, through the respective NMOS $N5_0$ . . . . $N5_N$ which draws an increasing current from 0 to N. The law according to which the currents $I_0$ . . . . $I_N$ increase from 0 to N may be different depending on the transformer characteristics (also it may depend more generically on processing limitation of the technology), it may be monotonously increasing, it may increase by a fixed multiplication factor, e.g., double, with each subsequent value of the index i from 0 to N, it may follow a $2^i$ law of increase or other increase law depending on index i or it may simply have a set of selected increasing values. In the exemplary case N may be equal to 4, thus five current generators are provided. Thus, the NMOS $N5_0$ . . . . $N5_N$ draw an increasing current, which can be obtained by using NMOS with increasing aspect ratio, while, buffers $BF_0$ . . . . $BF_N$ have increasing size one with respect to the other, i.e., are able to output an increasing driving current, indicated as gate signal Gate<0 . . . N> to the gate of the respective NMOS, i.e., adapt to the size of the NMOS. The form "Signal"<0 . . . N> here and in the following indicates that the signal by the name Signal carries one of the values from 0 to N.

Currents, number of paths and timing may be adapted according to frequency and energy of spikes.

The way to switch the current paths is managed by the generator switch on/off logic 4433 which selects the buffer $BF_0$ . . . . $BF_N$ in the module 4434 according to signal Start<0 . . . N> issued by the soft start logic module 4431 on the basis of the power on signal PON or according to signal Reg <0 . . . N> issued by the regulation logic module 4432 on the basis of the feedback signal FB.

Figure 6:
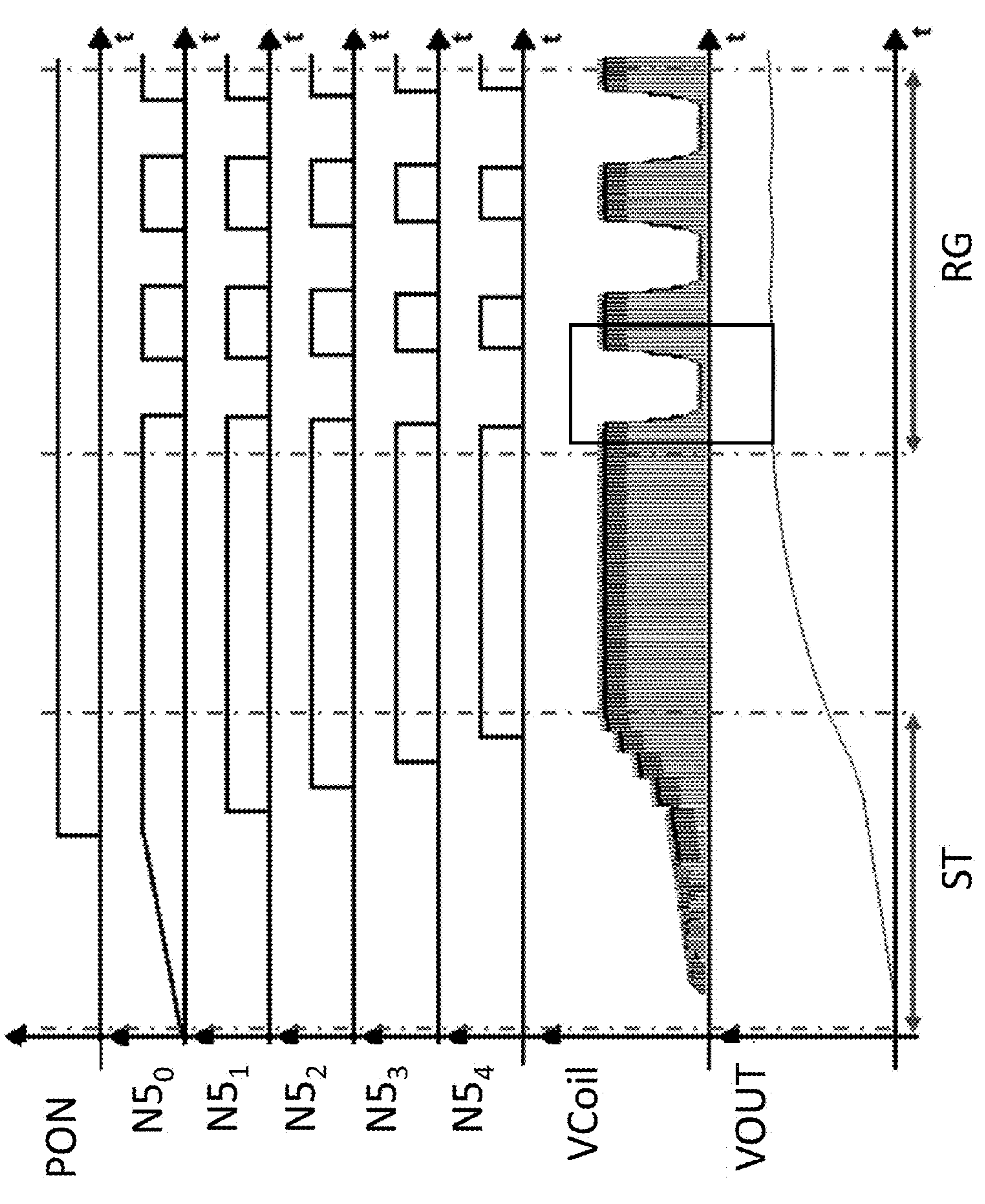
FIG. 6 is a time diagram of signals formed in the converter in embodiments during a startup phase and a regulation phase.

As shown with reference to FIG. 6, the logic 4433 is driven by module 4431 in a startup time interval ST, while is driven by the module 4432 at a regulation phase RG, which occurs at a different time.

The feedback signal FB may be brought to the logic module 443 by a respective isolation transformer, in the same way as shown in FIG. 3, or more generally by an isolated data channel.

In FIG. 6 it is shown a time diagram, indicating as a function of time t the PowerON signal PON, and the opening/closure state of the N+1 NMOS $N5_0$ . . . $N5_N$ (which may be equivalent to the drain source current flowing through them) with N=4, the coil voltage VCoil, i.e., the voltage on the inductive coil of transformer 42, and the output voltage VOUT.

FIG. 6 represents the startup time interval ST, which beginning is identified by the PowerOn signal PON going to high level (or the logic level which asserted indicates power on). During a startup time interval ST with PowerOn signal PON asserted, the NMOS switches NMOS $N5_0$ . . . $N5_N$ are switched on in sequence from turn on from $N5_0$ to $N5_N$, that is from the smallest to the largest increasing accordingly the current flowing in the oscillator 41.

This startup time interval ST, which is commanded by module 4431 to module 4433 which in turn selects the buffer to activate among buffers $BF_0$ . . . $BF_N$ to obtain the sequence of switch on shown in FIG. 6, allows to obtain a smooth start of all power nets that gradually go up. The gate voltage of the MOS $N5_0$ in startup phase is managed differently from others MOS in particular increased gradually with input voltage VIN. It allows a gradually soft start of the Vcoil.

Figure 7:
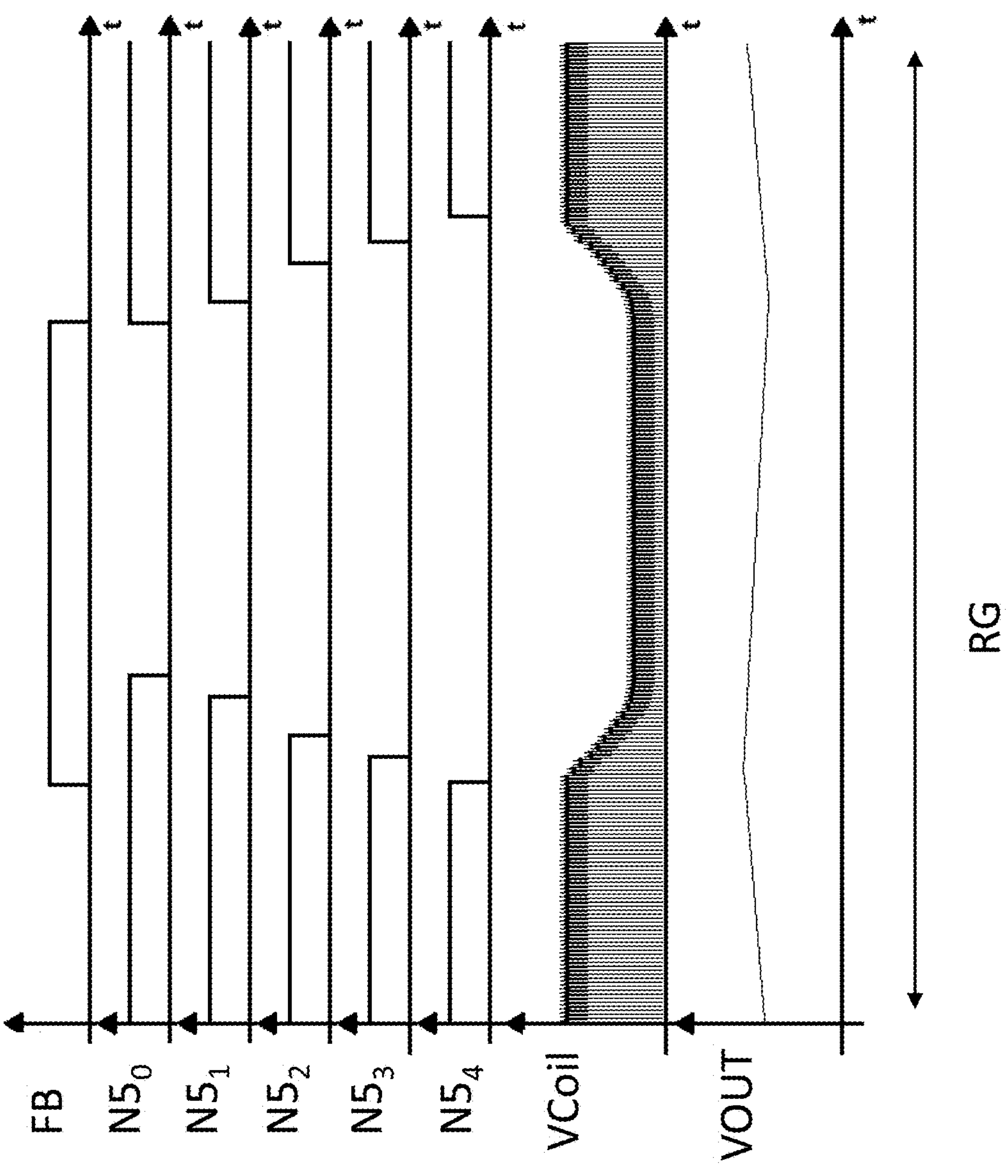
FIG. 7 is a time diagram of signals formed in the converter in embodiments during a regulation phase.

In FIG. 7 it is shown a time diagram, indicating as a function of time t the feedback signal FB, and the opening/closure state of the N+1 NMOS $N5_0$ . . . $N5_N$, with N=4, the coil voltage VCoil and the output voltage VOUT. FIG. 7 represents only the regulation phase RG, which is also visible in the diagram of FIG. 6, following the startup interval ST after an interval in which the output voltage VOUT reaches the set point value, i.e., reference voltage REF.

When the feedback signal FB is low level (or the logic level to which is asserted indicates that VOUT, in particular the value of VOUT divided by the divider value is below REF), all the N+1 NMOS $N5_0$ . . . $N5_N$ are conducting, thus the NMOS $N5_0$ . . . $N5_N$ are all closed drawing the respective currents $I_0$ . . . $I_N$ from the NMOS N1, N2. The output voltage VOUT therefore increases.

When the feedback signal FB goes high, i.e., the output signal VOUT is above the reference voltage REF the NMOS $N5_0$ . . . $N5_N$ turn off one after the other starting from $N5_N$, where N=4 in this case, with a given time delay between one closure and the other. This makes the coil voltage Vcoil to decrease gradually, without dangerous peaks.

When the feedback signal FB goes low, i.e., the output signal VOUT is below the reference voltage REF the NMOS $N5_0$ . . . $N5_N$ turn on one after the other starting from $N5_0$ to $N5_N$ where N=4 in this case, with a given time delay. This makes the coil voltage Vcoil to increase gradually, without dangerous peaks.

From the description here above are clear the advantages of the solution here described.

Such advantages in an area of integrated power conversion with galvanic isolation are essentially linked to the simplification of the entire system, accompanied by low consumption and area occupation, guaranteeing high safety and efficiency standards.

Thus, by operating at a frequency of the system tuned at sub-resonant point, in particular at a sub-harmonic frequency, lower than the resonant frequency at the highest Q of the LC-Tank, the switching losses on the analog power switches are decreased.

Then, the secondary side is advantageously made with central tap and works as synchronous rectifier, increasing the efficiency on the secondary side.

The use of a quantized current to control the oscillator makes possible to manage in safe the current and avoid voltage spikes.

Advantageously, the control logic implements soft start and soft regulation circuit that guarantees safety against voltage peaks due LC tank and prevents from using other protections that are often expensive in terms of area and efficiency.

Without prejudice to the underlying principles, the details and the embodiments may vary, even significantly, with respect to what has been described by way of example only, without departing from the scope of protection.

The DC-DC converter with galvanic isolation here described can be used as standalone isolated DC-DC converter. Also it can be used in other architectures requiring DC-DC conversion with galvanic isolation such as the DC-DC conversion supplying an isolated supply voltage to an isolated driver.

As mentioned applications may also include PLC analog input and output modules, Isolated Interface and sensors, motor control, industrial automation, isolated voltage and current sensing, RS-485/RS-422/CAN transceivers, medical equipment.

In embodiments the converter may operates at a frequency frequencies may between 10 and 100 MHz, in variant embodiments may be between 10 and 200 MHz. The range of the frequencies may depend on the technology used, e.g., frequency limits for losses, if BCD technology is used an upper limit of the frequencies may be around 100 MHz.

The extent of protection is defined by the annexed claims.

A DC-DC converter (30; 40) with galvanic isolation may be summarized as including a resonant oscillator (31; 41, 42*a*) coupled to a primary winding (42*a*) of a galvanic isolation transformer (32; 42), a rectifier (33; 43) being coupled to a secondary winding (42*b*) of said galvanic isolation transformer (32; 42) to provide an output voltage (VOUT), said DC-DC converter (30; 40) comprising a regulation loop (44) configured to regulate said output voltage (VOUT) with respect to a reference voltage (REF) by controlling a current flowing in said resonant oscillator (41, 42*a*) as a function of the result of a signal indicative of the comparison (PFB; FB) between said output voltage (VOUT) and said reference voltage (REF), wherein said resonant oscillator (41, 42*a*) is configured to operate at a frequency, in particular tuned at sub-resonant point, in particular at sub-harmonic frequency, below the resonance frequency of said resonant oscillator (41, 42*a*) which maximizes the quality factor of the resonant oscillator (41, 42*a*), in particular below the resonance frequency of a LC tank circuit (CT, 42*a*) comprised in said resonant oscillator (41, 42*a*) which maximizes the quality factor of said LC tank circuit (CT, 42*a*).

Said operating frequency may be a sub-harmonic of the resonance frequency.

Said galvanic isolation transformer (42) may include a central tap (Tc1) on the primary winding (42*a*) to which the output of the resonant oscillator (41) may be coupled and a central tap (Tc2) on the secondary winding (42*b*) to which the input of the rectifier is coupled, and the rectifier is a synchronized rectifier Said regulation loop (44) may include a current generator module (N5) which may determine the current flowing in said resonant oscillator current sink, which may include a plurality of current generators (N$5_0$ . . . N$5_N$) in parallel setting a respective current path ($I_0$ . . . $I_N$) from the resonant oscillator (41) when activated.

Said regulation loop (44) may include a logic module (441) receiving as input said signal indicative of the comparison (FB) between said output voltage (VOUT) and said reference voltage (REF) and configured to select for activation a corresponding set of current generators (N$5_0$ . . . N$5_N$) in said plurality of current generators (N$5_0$ . . . N$5_N$).

Said logic module (441) may be configured to switch off the plurality of current generators (N$5_0$ . . . N$5_N$) in sequence, in particular from the current generator (N$5_0$ . . . N$5_N$) drawing the greater current to the smaller, when the output voltage (VOUT) is greater than the reference voltage (REF), and to switch on the plurality of current generators (N$5_0$ . . . N$5_N$) in sequence, in particular from the current generator (N$5_0$ . . . N$5_N$) drawing the smaller current to the greater, when the output voltage (VOUT) is smaller than the reference voltage (REF).

Said logic module (441) may be configured to switch on the plurality of current generators (N$5_0$ . . . N$5_N$) in sequence, in particular from the current generator (N$5_0$ . . . N$5_N$) drawing the smaller current to the greater, during a power on interval (ST) indicated by a respective power on signal (PON).

Said transformer (42) may be an integrated coreless transformer, in particular to be integrated in a System in Package (SiP).

Said converter may operate at a frequency in a range between tens and hundreds of MHz, in particular between 10 and 200 MHz.

A method of controlling a DC-DC converter may be summarized as including switching off the plurality of current generators (N$5_0$ . . . N$5_N$) in sequence, in particular from the current generator (N$5_0$ . . . N$5_N$) drawing the greater current to the smaller, when the output voltage (VOUT) is greater than the reference voltage (REF), and to switch on the plurality of current generators (N$5_0$ . . . N$5_N$) in sequence, in particular from the current generator (N$5_0$ . . . N$5_N$) drawing the smaller current to the greater, when the output voltage (VOUT) is smaller than the reference voltage (REF).

A method of controlling a DC-DC converter may be summarized as including switching on the plurality of current generators (N$5_0$ . . . N$5_N$) in sequence, in particular from the current generator (N$5_0$ . . . N$5_N$) drawing the smaller current to the greater, during a power on interval (ST) indicated by a respective power on signal (PON).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A DC-DC converter, comprising:

a resonant oscillator coupled to a primary winding of a galvanic isolation transformer, a rectifier being coupled to a secondary winding of the galvanic isolation transformer to provide an output voltage; and a regulation loop configured to regulate the output voltage with respect to a reference voltage by controlling a current flowing in the resonant oscillator based on a signal indicative of a comparison between the output voltage and the reference voltage, the regulation loop including:

a current generator stage including a plurality of current generators in parallel; and a logic stage configured to:

switch off the plurality of current generators in sequence from a current generator drawing a largest current to a current generator drawing a smallest current in response to the output voltage being greater than the reference voltage; and switch on the plurality of current generators in sequence from the current generator drawing the smallest current to the current generator drawing the largest current in response to the output voltage being less than the reference voltage, wherein the resonant oscillator is configured to operate at a frequency that is below a resonance frequency of the resonant oscillator and which improves a quality factor of the resonant oscillator.

2. The converter of claim 1, wherein the resonant oscillator is configured to operate at the frequency that is below a resonance frequency of an LC tank circuit of the resonant oscillator which maximizes a quality factor of the LC tank circuit.

3. The converter of claim 1, wherein the resonant oscillator is configured to operate at the frequency that is tuned at a sub-harmonic frequency.

4. The converter of claim 1, wherein an operating frequency is a sub-harmonic of the resonance frequency.

5. The converter of claim 1, wherein the galvanic isolation transformer includes:

a central tap on the primary winding to which an output of the resonant oscillator is coupled; and a central tap on the secondary winding to which an input of the rectifier is coupled, and the rectifier is a synchronized rectifier.

6. The converter of claim 1, wherein the current generator stage is configured to determine the current flowing in a resonant oscillator current sink, the plurality of current generators in parallel setting a respective current path from the resonant oscillator when activated.

7. The converter of claim 6, wherein logic stage is configured to:

receive the signal indicative of the comparison between the output voltage and the reference voltage; and select for activation a corresponding set of current generators of the plurality of current generators.

8. The converter of claim 7, wherein the logic stage is configured to:

switch on the plurality of current generators in sequence from the current generator drawing the smallest current to the current generator drawing the largest current during a power on interval indicated by a respective power on signal.

9. The converter of claim 1, wherein the galvanic isolation transformer is an integrated coreless transformer.

10. The converter of claim 1, wherein the converter operates at a frequency in a range between 10 and 200 megahertz (MHz).

11. The converter of claim 1, wherein the resonant oscillator includes a plurality of cross coupled transistors.

12. The converter of claim 11, wherein each transistor is an NMOS transistor.

13. A method, comprising:

providing an output voltage by a rectifier that is coupled to a secondary winding of a galvanic isolation transformer, a resonant oscillator being coupled to a primary winding of the galvanic isolation transformer;

regulating, by a regulation loop, the output voltage with respect to a reference voltage by controlling a current flowing in the resonant oscillator based on a signal indicative of a comparison between the output voltage and the reference voltage;

operating, by the resonant oscillator, at a frequency that is below a resonance frequency of the resonant oscillator and which improves a quality factor of the resonant oscillator;

switching off a plurality of current generators in sequence from a current generator drawing a greatest current to a current generator drawing a smallest current in response to the output voltage being greater than the reference voltage; and switching on the plurality of current generators in sequence from the current generator drawing the smallest current to the current generator drawing the greatest current in response to the output voltage being less than the reference voltage.

14. The method of claim 13, comprising:

switching on the plurality of current generators in sequence from the current generator drawing the smallest current to the current generator drawing the greatest current in response to a power on interval indicated by a respective power on signal.

15. The method of claim 13, comprising:

operating, by the resonant oscillator, at the frequency that is below a resonance frequency of an LC tank circuit of the resonant oscillator which maximizes a quality factor of the LC tank circuit.

16. The method of claim 13, comprising:

operating, by the resonant oscillator, at the frequency that is tuned at a sub-harmonic frequency.

17. The method of claim 13, wherein an operating frequency is a sub-harmonic of the resonance frequency.

18. The method of claim 13, wherein the galvanic isolation transformer includes:

a central tap on the primary winding to which an output of the resonant oscillator is coupled; and a central tap on the secondary winding to which an input of the rectifier is coupled, and the rectifier is a synchronized rectifier.

19. The method of claim 13, comprising:

determining, by a current generator stage of the regulation loop, a current flowing in a resonant oscillator current sink, wherein the current generator stage includes a plurality of current generators in parallel that set a respective current path from the resonant oscillator when activated.

20. The method of claim 19, comprising:

receiving, by a logic stage of the regulation loop, the signal indicative of the comparison between the output voltage and the reference voltage; and selecting, by the logic stage, for activation a corresponding set of current generators of the plurality of current generators.

* * * * *